July 13, 1965  H. J. EPPIG ETAL  3,194,110
METHOD OF DETECTING OXYGEN CONTAMINANT IN SEALED ENVELOPES
Filed Dec. 28, 1961  2 Sheets-Sheet 1
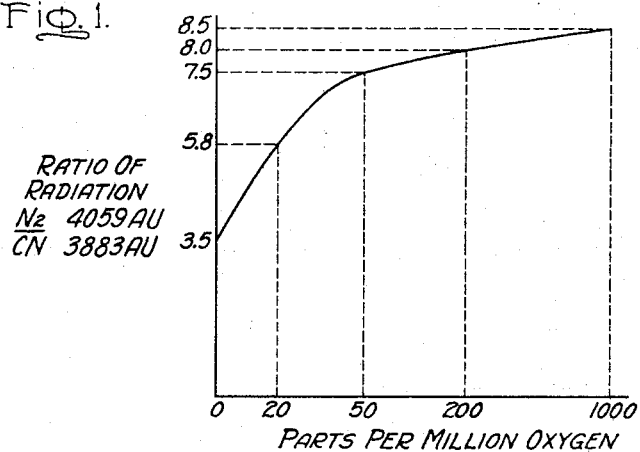
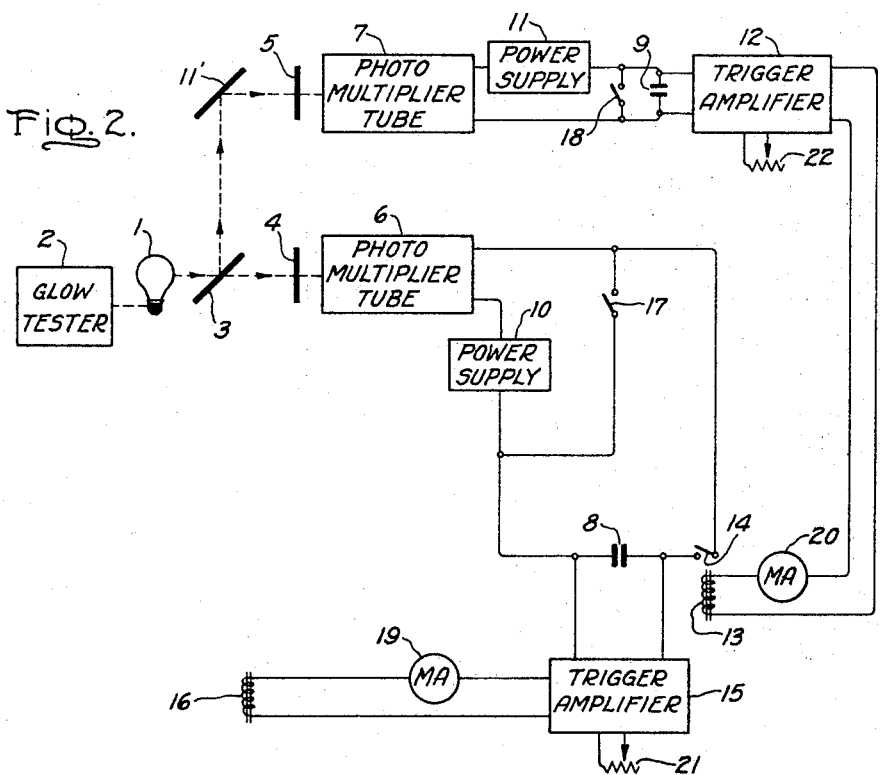
Inventors:
Henry J. Eppig
Gordon J. Kennedy
by Otto Tichy
Their Attorney

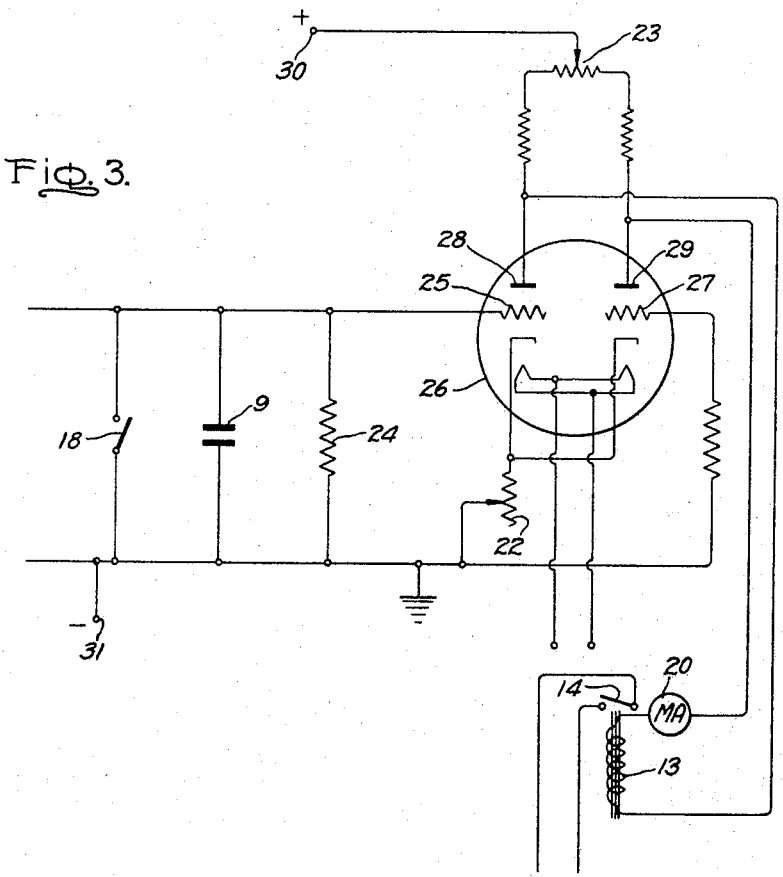

3,194,110
METHOD OF DETECTING OXYGEN CONTAMINANT IN SEALED ENVELOPES
Henry J. Eppig, Cleveland Heights, and Gordon J. Kennedy, Cleveland, Ohio, assignors to General Electric Company, a corporation of New York
Filed Dec. 28, 1961, Ser. No. 162,880
4 Claims. (Cl. 88—14)

This invention relates to a method of detecting the presence of oxygen as a contaminant in sealed enclosures such as the envelopes of electric lamps, and more particularly to a method of detecting the leakage of atmospheric air into such enclosures by detection and measurement of the oxygen content therein.

With the increase in recent years in operating speeds of automatic equipment for the manufacture of various types of electric lamps, including incandescent and gaseous electric discharge lamps, it has been found that there is a greater tendency toward intervals of production of lamps with defective glass seals. The defects are in the nature of very small cracks or openings around the seal between the envelope and the conventional re-entrant stem or in the area of the seal of the lead-in wires through the stem. These cracks are sometimes so small as to be unnoticed during normal light-up and inspection of the lamps at the time of manufacture. However, as the lamps lie dormant for periods of weeks or months, sufficient air leaks into the lamps to cause them to burn out immediately upon being energized.

It is therefore an object of the invention to provide a highly sensitive method of detecting leakage of air into lamps or other sealed devices. It is another object to provide a method for high speed automatic detection of such leakage. It is a still further object to provide a method capable of detecting the presence in the lamp, or other device, of as little as 20 parts per million of oxygen.

The method in accordance with the invention has the advantages that not only does it prevent defective lamps or other devices from getting into stock, but it gives the operator of manufacturing production equipment a rapid indication of a rise in the number of defective units at the time of manufacture so that corrective action can quickly be taken.

The principle of operation of the method in accordance with the invention is based upon the discovery that very small amounts of oxygen will suppress the radiation from a cyanogen radical (CN) molecular spectrum. Accordingly, in a transparent sealed envelope, such as an electric lamp bulb, containing a source of cyanogen radical, an accurate indication of the amount of oxygen present can be obtained by exciting the atmosphere in the envelope by high frequency radiation and measuring the intensity of radiation of the cyanogen radical molecules. This measurement provides a signal indicative of the content of oxygen in the envelope by virtue of suppression of the cyanogen radical emission. Thereby, lamps can be rejected which are indicative of excess oxygen as compared to a measurement or signal of known value adapted as a reference.

However, since the absolute intensity of emission of the CN spectrum at constant concentration is dependent upon such factors as temperature, intensity of the high frequency discharge, etc., it is preferable to compare the intensity of the CN spectrum with the intensity of the radiation of another gas which is normally present, or which may be deliberately added, and is used as a standard or reference. The ratio is a measure of the oxygen content, and the lamp is rejected when the ratio either rises above or falls below a preselected limit, depending upon whether one selects the ratio of nitrogen to cyanogen emission or the reciprocal ratio. The said other gas is preferably nitrogen which is ordinarily present in electric lamps or which may be deliberately added in a small amount. However, other ionizable gas may be employed, such as argon, neon, xenon, helium, a halogen, etc. With the rare gases, a higher energy of excitation must be used to overcome the difference in excitation potential between the rare gas and nitrogen.

More particularly, there are small amounts of carbon-containing reducing gases normally present in electric lamps, along with nitrogen. For instance, the normal fill gas in incandescent lamps comprises argon and about 5 to 15% nitrogen. The carbon-containing gas may be a trace of carbon monoxide or a hydrocarbon gas. If not already present, the nitrogen and carbon-containing gases may be added in trace amounts to the fill gas. For instance, cyanogen gas may be added in a trace amount, by volume, of a few parts per million (p.p.m.) of the normal fill gas to serve as a source of CN, or both CN and nitrogen. When excited by high frequency, the gases, such as CO or hydrocarbons combine with nitrogen to form the unstable CN molecule and also an excited nitrogen molecule which produce very strong spectral emission bands at several discrete wavelengths. As pointed out above, the presence of oxygen in amounts greater, by volume, than about 20 parts per million exerts a very marked suppression of the spectral emission produced by the CN molecule when the carbon-containing gas is present in concentrations less than 20 p.p.m. Therefore, measurement of the ratio of the spectral intensity of the nitrogen molecule at a given wavelength to the intensity of the CN molecule at another wavelength will provide an accurate indication or signal of the amount of oxygen present. With greater amounts of carbon-containing gas in the envelope, greater amounts of oxygen are required to markedly suppress the CN emission. However, the process would be useful in lamp testing even if it were limited to detection of the presence of oxygen in amounts of about 0.1% or more.

The preferred wavelengths for measurement are 3883 angstrom units for CN and 4059 angstrom units for nitrogen. Other wavelengths may be chosen, but with somewhat more difficulty with regard to spectral overlap and other interferences.

Ratio measurement is conveniently obtained by means of an assembly of two photomultiplier tubes and a beam splitter mirror whereby the light from the excited lamp is passed in approximately equal amounts to each of the two photomultiplier tubes. One tube is equipped with an interference filter which passes only the wavelengths in the immediate vicinity of the CN molecular band (3883 A.U.) and the other tube is equipped with a filter which passes only the energy from the nitrogen molecular band at 4059 A.U. In order to average the photoelectric intensity over the small period of time of measurement, the photocurrents are preferably employed to charge capacitors. The charge on the respective capacitors is most expeditiously measured with electrometer tubes to avoid discharging the capacitors while readings are being made.

The lamps are rejected when the ratio of the measurements of intensity of the nitrogen to cyanogen bands rises above a preselected value obtained from the following table of measurements made on incandescent lamps deliberately doped with oxygen:

| Oxygen content in parts per million: | Spectral ratio, (4059/3883) |
|---|---|
| Less than 10 | 2.5 |
| 20 | 5.8 |
| 50 | 7.5 |
| 200 | 8.0 |
| 1000 | 9.0 |

The above ratios and the differences between lamps can be magnified greatly by the choice of sharper cut-off filters. Energy differences measured spectroscopically with good resolution show much larger changes in ratio.

In order to provide a basis for high speed automatic inspection of the lamps on a conveyor, trigger amplifiers are used to replace the electrometers. Then one capacitor may be allowed to charge to a fixed preset value, at which point, the triggering amplifier interrupts the charging circuit of the second capacitor. The charge on the second capacitor then determines whether the lamp is acceptable from the standpoint of oxygen content. The charge on the second capacitor can then be used to trigger a relay or other device to mark or eject defective lamps.

In the drawing, FIG. 1 is a graph showing the ratio of nitrogen radiation to cyanogen radical (CN) radiation plotted against oxygen content in parts per million, of lamps doped with oxygen, FIG. 2 is a block diagram of a preferred circuit which may be used in conjunction with an indexing turret type testing unit, and FIG. 3 is a circuit diagram of a trigger amplifier.

Referring to FIG. 2 of the drawing, the lamp 1 under test may be a conventional incandescent lamp comprising a glass bulb containing a tungsten filament and filled with argon and about 12%, by volume, nitrogen at a total pressure of some 600 mm. Hg. As mentioned above, the bulb of the lamp 1 also contains a small amount, ordinarily a few parts per million, of carbon-containing reducing gas such as carbon monoxide. The gases in the lamp 1 are excited by high frequency radiation from any suitable source such as a conventional oscillator or glow tester shown at 2. The glow tester 2 may, for example, produce low-power radio frequency at about 300–500 kilocycles per second. The carbon monoxide and some of the nitrogen combine to form CN molecules under the influence of the glow discharge so that the radiation emitted from the lamp includes the spectra of excited CN molecules and nitrogen molecules.

By means of a beam splitting mirror 3, the light radiation entering the test device is equally divided between respective filters 4 and 5. The filter 5 passes only energy from the nitrogen molecule at 4059 A.U., and the filter 4 passes only the wavelengths in the immediate vicinity of the CN molecule at 3883 A.U. The two light beams simultaneously enter respective photomultiplier tubes shown at 6 and 7, such as those commercially designated RCA6217, and which give a measurable current output proportional to the intensity of the radiation. The output current from each tube is then used to charge up respective capacitors 8 and 9. Both circuits are equipped with a regulated power supply, shown at 10 and 11, of 600–900 volts D.C., for example. As here illustrated, that half of the beam reflected by the beam splitting mirror 3 is reflected by a mirror 11′ toward the photomultiplier tube 7.

When the charge on the nitrogen capacitor 9, as measured by its trigger amplifier 12, reaches a preset value (for example 10 volts), the coil 13 of a relay opens its normally closed contacts 14 which are in the charging circuit of the cyanogen capacitor 8. The said capacitor 8 thus stops charging when the capacitor 9 reaches its preset voltage.

The voltage charge on the capacitor 8 is measured with the trigger amplifier 15. If this charge is above a preset value (for example 5 volts) a rejection mechanism (not shown) is prevented from being energized by action of a relay 16 from the trigger amplifier 15. The action of this rejection mechanism may be used to operate an electrical or mechanical system on the drive shaft of the testing unit to pass acceptable lamps into a packaging machine in subsequent index position.

In certain production inspection operations it may be advantageous to have the cyanogen relay 16 reject lamps when the charge on the cyanogen capacitor 8 falls below, rather than above, a predetermined point. In that case it is merely necessary to employ a different set of relay contacts.

Cam operated shorting switches 17 and 18 may be located in the charging circuits of both capacitors 8 and 9 in order to short out the electrical portion of the equipment while the machine is indexing.

Ammeters 19 and 20 may be connected into the lines following the respective trigger amplifiers 15 and 12. Readings from these meters will show the operating conditions for a particular day, which in turn will determine the level at which the trigger amplifiers should be set to provide for proper rejection of lamps. The trigger amplifiers are provided with respective potentiometers 21 and 22 for adjustment of settings.

For further details of operation of the trigger amplifiers 12 and 15, reference is directed to the detailed showing of one of them (amplifier 12) in FIG. 3, in conjunction with the following description. Prior to measurement, the zero point of the amplifier is adjusted with the potentiometer 23 so that the milliammeter 20 (0–3 milliamperes) reads zero with the shorting switch 18 closed. Then immediately before measurement, the switch 18 is opened. The charge building up on the capacitor 9 from phototube 7 (FIG. 2), across the ten megohm grid resistor 24, causes the grid 25 of the type 12BH7 electron tube 26 to swing to a slightly negative position, thus reducing the conductance of that side of the tube. The other side (grid 27) remains at a constant potential, serving as a reference. The difference in potential across the two plates 28 and 29 causes a current to flow through the ammeter 20 and the relay coil 13. The magnitude of the current, up to three milliamperes, is proportional to the charge on the capacitor 9. At a precisely determined point in the current rise curve, the relay 13 pulls in, resulting in the desired trigger action. The relay 13 is of a high speed mercury wetted type with a pull-in time of less than two milliseconds and a pull-in current of less than three milliamperes. During an extended period of operation, some drift in amplifier conductance characteristics may be noted. This may be corrected by a change in the setting of the potentiometer 22. The amplifier is operated from a regulated power supply of 250 volts D.C. indicated by the terminals 30, 31.

It is desirable that there be a delay of at least three and one-half minutes, and preferably five minutes, between the finish of the lamp manufacturing operations and the beginning of the testing. This delay allows the lamp to cool down from the elevated temperature resulting from the manufacturing operations, and allows a detectable amount of air to enter the lamp in case it has a slow leak.

It will be evident that, by indicating the presence of oxygen in sealed lamp envelopes, the method will detect not only lamps with slow leaks but also lamps which have been ineffectively exhausted or which were inadvertently made without oxygen-absorbing getter and which therefore contain residual excessive amounts of oxygen.

Lamps may be tested in accordance with the invention at rates as high as 10,000 per hour. They are sensed and measured in about $1/10$ second.

What we claim as new and desire to secure by Letters Patent of the United States is:

1. The method of detecting the presence of contaminating oxygen in a sealed transparent envelope containing sources of traces of cyanogen radical (CN) and another excitable gas which comprises producing a glow discharge in the envelope to form excited cyanogen radical molecules and excited molecules of said other gas, and measuring the ratio of the spectral intensity of the cyanogen radical molecules at a given wavelength to the spectral intensity of the molecules of said other gas at another given wavelength to obtain a signal indicative of the oxygen content in said envelope by virtue of suppression of the emission produced by the cyanogen radical molecules by ionized oxygen.

2. The method set forth in claim 1 wherein the said other gas is nitrogen.

3. The method of detecting the presence of contaminating oxygen in a sealed envelope containing nitrogen gas and traces of a reducing carbon-containing gas which comprises exciting the said gases to form excited cyanogen radical (CN) molecules and excited nitrogen molecules, measuring the spectral intensity of the nitrogen molecules at a given wavelength and the spectral intensity of the cyanogen radical molecules at another wavelength, and comparing the spectral intensities to provide an indication of the oxygen content in the envelope by virtue of suppression of the emission produced by the cyanogen radical molecules by ionized oxygen.

4. The method set forth in claim 3 wherein the said given wavelength of spectral emission of nitrogen is substantially 4059 A.U. and that of the cyanogen radical is substantially 3883 A.U.

References Cited by the Examiner

UNITED STATES PATENTS

| | | | |
|---|---|---|---|
| 2,532,644 | 12/50 | Robinson | 209—111.5 X |
| 2,987,182 | 6/61 | Ator et al. | 209—111.5 |
| 3,032,654 | 5/62 | Fay et al. | 88—14 X |

OTHER REFERENCES

Spectrochemical Analysis Using Controlled Atmospheres With a Simple Gas Jet, C. S. Annell and A. W. Helz, U.S. Geol. Survey Research, 1960–USGS Profess. Papers, No. 400–B, 227 (1960).

Conway et al.: The Emission Spectrum of Curium, Journal of the American Chemical Society, vol. 73, 1308-1309.

Suppression of Cyanogen Bands for the Spectrographic Analysis of Erbium Oxide, Hammager et al, Applied Spectroscopy–12, 161-3, 1958.

FREDERICK M. STRADER, *Primary Examiner.*

CLAUDE A. LE ROY, JEWELL H. PEDERSEN,
*Examiners.*